R. DUDLEY.
Spring-Seat for Vehicles.
No. 195,888. Patented Oct. 9, 1877.
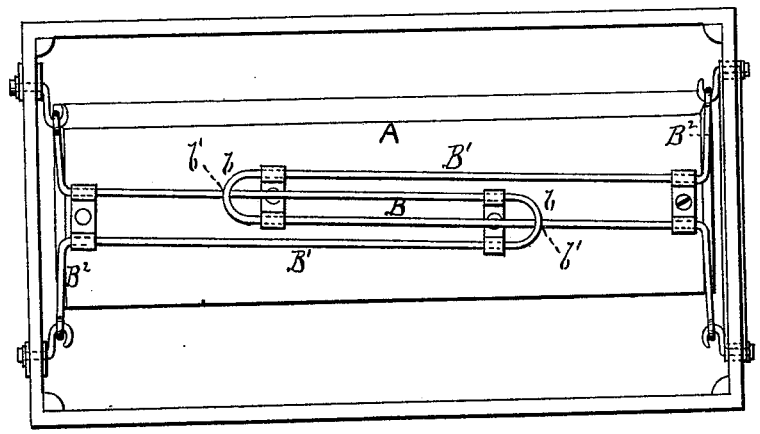
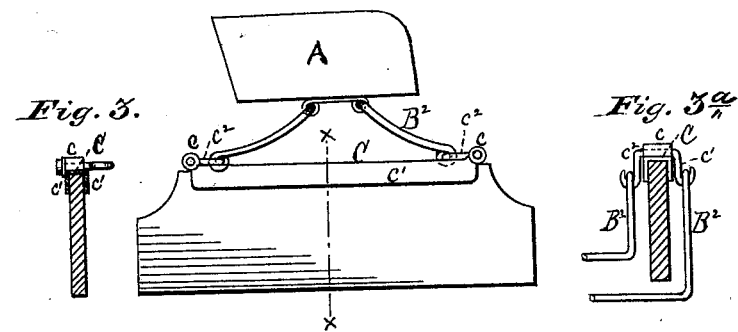
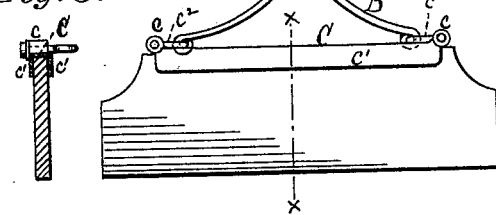
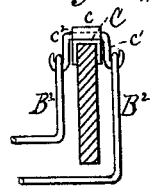
Witnesses:
John Dennisy.
John K. Jones.
Inventor:
Richard Dudley.
per Edwin James.
Attorney.

UNITED STATES PATENT OFFICE.

RICHARD DUDLEY, OF ERIE, PENNSYLVANIA.

IMPROVEMENT IN SPRING-SEATS FOR VEHICLES.

Specification forming part of Letters Patent No. 195,888, dated October 9, 1877; application filed August 3, 1877.

*To all whom it may concern:*

Be it known that I, RICHARD DUDLEY, of the city and county of Erie and State of Pennsylvania, have invented certain Improvements in Springs for Vehicle-Seats, of which the following is a full, clear, and exact description, reference being had to the accompanying drawing, and the letters of reference marked thereon, making part of this specification, in which—

Figure 1 is a bottom-plan view of the wagon-seat. Fig. 2 is an end view of the same. Fig. 3 is a sectional view on the line $x\ x$, Fig. 2. Fig. $3^a$ is a modification, illustrating double clips connected with the ears of the metal bar, to each one of which is attached the lateral lever-arm of a torsional spring.

My invention consists in connecting the lateral lever-arms of the torsional springs to a flanged metal bar secured to the sides of the vehicle by means of clips, which are pivoted in ears attached to the ends of said flanged metal bar.

The construction and operation of my invention are as follows:

A is the seat of the vehicle, to the bottom of which the torsional springs are secured. B B are the torsional springs. These torsional springs B B are constructed with a head, $b$, of an arched form, whereby great strength is gained where the same is required. The heads $b\ b$ of these torsional springs are also constructed with a groove or recess at $b'$, to enable the long torsional arm $B^1$ of one spring to pass under or over the head of the other. This enables me to extend the torsional arms of the springs nearly the full length of the bottom of the seat, if desired. $B^1\ B^1$ are the torsional arms of the springs, and $B^2\ B^2$ the lateral lever-arms. To each side of the vehicle is secured, by means of flanges $c^1\ c^1$, which fit over the sides of the same, a metal bar, C. This bar is provided at its ends with ears $c\ c$, projecting up from the same. These ears $c\ c$ are formed with holes or orifices, in which are pivoted the clips $c^2\ c^2$. These clips are formed with shanks, which pass through the holes in the ears $c\ c$, and terminate at their outer ends in hooks, which pass into loops or eyes formed at the termination of the lateral lever-arms $B^2\ B^2$, securing the same to the clips, as clearly shown in Fig. 2.

If desired, the clips $c^2\ c^2$ may be made straight instead of hooked, and the lateral lever-arms $B^2\ B^2$ secured to the same by a pin or nut.

When desired, the pivoted clips may extend both inside and outside of the wagon-body, as shown in Fig. $3^a$, in which case double springs would be used, the springs being made of such shape that the lateral lever-arms of both shall extend in the same direction.

In some cases it may be desirable to have the single clips extend outside of the body of the vehicle, or simply to reverse their present position.

I do not desire to confine myself to the use of this form and connection of torsional springs to vehicle-seats, as they may also be applied to the bolsters and axles of wagons and other vehicles.

What I claim as new, and desire to secure by Letters Patent of the United States, is—

The flanged metal bar C, provided with perforated ears $c\ c$, pivoted clips $c^2\ c^2$, which terminate in hooks, and whose shanks pass through the perforated ears $c\ c$, in combination with the long torsional arms $B^1$, formed with arched heads $b\ b$, said heads being recessed at $b'$, and lateral lever-arms $B^2$, substantially as described.

In testimony that I claim the foregoing I have hereunto set my hand this 16th day of July, 1877.

RICHARD DUDLEY.

Witnesses:
   D. B. McCREARY,
   WM. P. HAYES.